Oct. 25, 1949.     A. K. EDGERTON     2,486,010
FLASH BULB IGNITER
Filed Oct. 7, 1946
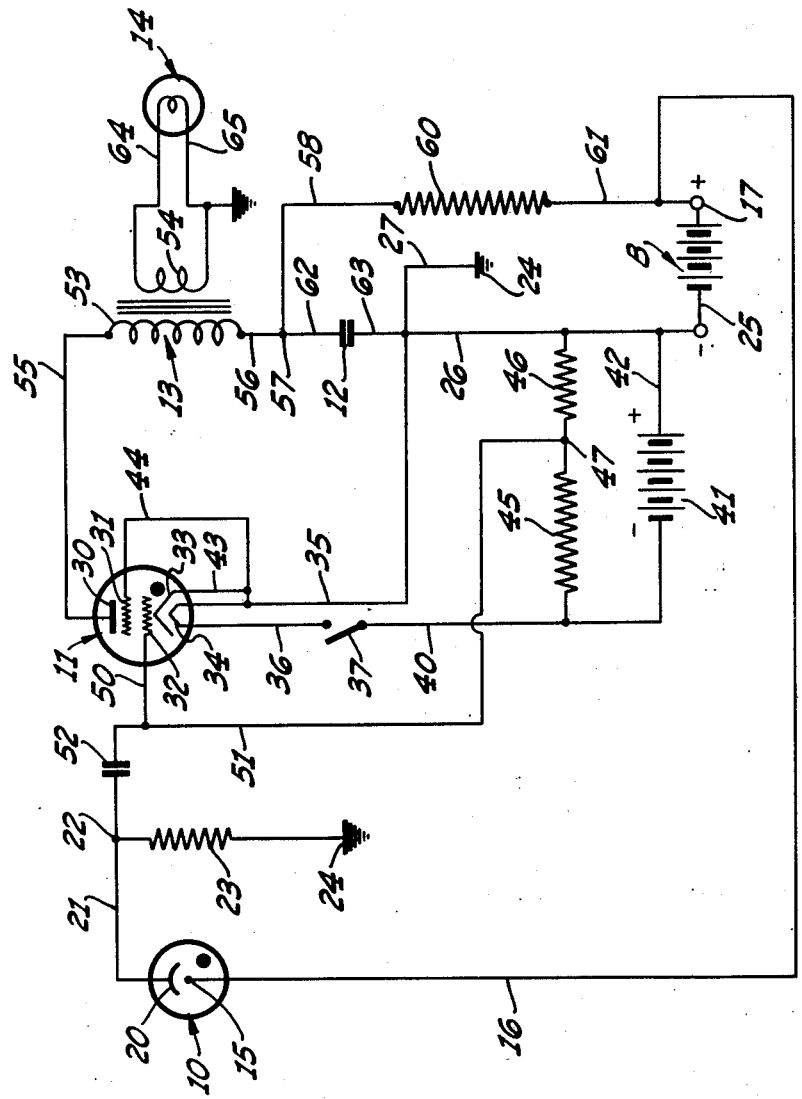
ALBERT K. EDGERTON,
INVENTOR
BY
ATTORNEY.

Patented Oct. 25, 1949

2,486,010

UNITED STATES PATENT OFFICE 2,486,010

FLASH BULB IGNITER

Albert K. Edgerton, Los Angeles, Calif.

Application October 7, 1946, Serial No. 701,849

3 Claims. (Cl. 67—31)

This invention relates generally to photographic lighting devices and more particularly to devices used to remotely control the igniting of a so-called flash bulb such as is used in making flash light pictures.

Where the field to be covered by a camera is relatively small, it is a fairly simple matter to illuminate this field by two or more flash bulbs which may be located at different points, but which are nevertheless controlled by a single switch and source of power. However, when the illumination requirements are such that the field must be illuminated by flash bulbs located at widely separated points, the power requirements of the individual bulbs may be such that an excessive voltage drop will be experienced by each of the bulbs if all are energized by a single source of power. While all of the bulbs will normally be ignited, the voltage drop will have increased the heating time of the fuse or filament within the flash bulb, and while this delay may be very slight, it is nevertheless sufficient to destroy any synchronism between the various flash bulbs, and between indivdual bulbs and the shutter of the camera.

Various attempts have been made to insure the synchronization of the various flash bulbs with each other and with the camera shutter, but these attempts have generally been unsuccessful because of the voltage drop mentioned, or, where photo-electric controls have been used, by stray or random light falling on the photocell which has caused the premature discharge of the flash bulb. This difficulty has been particularly acute when exterior scenes are being photographed, since headlights of passing automobiles have caused the premature discharge of the flash bulbs and prevented the securing of proper illumination for the picture.

It is therefore the major object of this invention to provide an igniter for flash bulbs which may be controlled from a distance and synchronized with other flash bulbs.

Another object of the invention is to provide such an igniter wherein the time delay between the master control and the ignition of the flash bulb is in the order of microseconds, so that synchronization problems are reduced to a minimum.

It is a further object of this invention to provide such an igniter which is controlled by the discharge of a master flash bulb, but which is not operated by stray or random light of any normal intensity usually encountered in such work.

A further object of the invention is to provide such an igniter which is of relatively light weight, compact, and readily portable, and which requires no connection to any external electrical circuit.

It is a still further object of the invention to provide such an igniter which is quite simple and may be used by relatively inexperienced operators, while at the same time being relatively inexpensive to manufacture.

These and other objects and advantages of the invention will become apparent from the following description of a preferred form thereof, and from the drawing illustrating that form in which the single figure is a schematic wiring diagram of the circuit used in this igniter.

The circuit includes a photo cell 10 which is adapted to "trigger" a thyratron 11 to cause a capacitor 12 to discharge through a special transformer 13 and ignite a flash bulb 14.

Considering the circuit in somewhat greater detail, it will be seen that the anode 15 of photo cell 10 is connected by a conductor 16 to the positive terminal 17 of a source of power such as battery B. The cathode 20 of photo cell 10 is connected by conductor 21 to a terminal 22, and from the latter through a resistor 23 to a ground or common connection 24. The negative terminal 25 of the source of power previously mentioned is connected through conductors 26 and 27 to the common connection 24; and the photo cell 10 will thus have the voltage of the power source impressed across its terminals, less any voltage drop across resistor 23. When no light falls upon the photo cell 10, the current through the latter will be relatively small and there will be substantially no voltage drop across resistor 23. However, when the photo cell is illuminated, the current is increased and the voltage drop across resistor 23 is increased, changing the voltage of terminal 22 with respect to common connection 24. This voltage change is utilized as will hereinafter appear.

For reasons which will presently become apparent, the photo cell 10 should be one which has a sensitivity in the infra-red region of the spectrum, and should have a relatively high sensitivity with a relatively large current carrying capacity. This latter feature indicates that a gas-filled photo cell should be used, and it has been found that the cell commercially available under type 930 meets these requirements very satisfactorily. Other models may, of course, be used, the model number here given being by way of example only and not as a limitation.

The thyratron 11 is preferably of the indirectly heated cathode type, and includes an anode 30, a screen grid 31, a control grid 32, a cathode 33 and a heater 34. The heater 34 has one of its terminals connected by conductor 35 to conductor 26, and its other terminal is connected by conductor 36 to one of the terminals of a manually operated switch 37. The other terminal of switch 37 is connected by conductor 40 to the negative terminal of a source of power such as a battery 41, the positive terminal of which is connected by conductor 42 to conductor 26. Switch 37 thus controls the heating of the cathode 33; and since the high voltage source of power B may be permanently connected to terminals 17 and 25, this switch also controls the operation of the complete circuit.

Conductors 43 and 44 connect cathode 33 and screen grid 31 to grounded lead 35. A tube connected in this manner requires a relatively small change or swing in the voltage applied to its control grid in order to cause it to conduct, while a gas-filled triode without the screen grid 31, requires a much larger voltage swing if the tube is to be operated under stable conditions. As will be hereinafter pointed out it is desirable that tube 11 have a relatively high current carrying capacity and for this reason an indirectly heated type cathode is preferable. While other tubes may be used in this circuit, for the reasons given above and for other reasons which will later appear, a tube meeting all these requirements is very desirable, and such a tube is commercially available under the type number GL-546.

To provide the requisite bias voltage for the control grid 32, a pair of resistors 45 and 46 are connected in series to form a voltage divider which is connected to conductors 26 and 40. Terminal 47, which is the common point of connection of resistors 45 and 46, is thus at a potential intermediate between conductors 26 and 40, and in the case illustrated, is at a negative potential with respect to conductor 26 and hence cathode 33. Control grid 32 is connected by conductors 50 and 51 to terminal 47, and by a choice of suitable values for resistors 45 and 46, the control grid will be biased with a two-volt negative bias when the battery 41 is adapted to furnish six volts to the heater 34. This arrangement permits the bias to be automatically decreased in the proper ratio as battery 41 is discharged; and furthermore, the resistors 45 and 46 may be selected so that their resistance, in parallel, will be such as to furnish the proper resistance from control grid 32 to common connection 24. To complete the circuit of the control grid, a coupling capacitor 52 is connected between terminal 22 and conductor 50 so that any voltage change appearing at terminal 22 will be transmitted to the control grid 32 to control the operation of the thyratron 11.

Transformer 13, described hereinafter in greater detail, is provided with a primary winding 53 and a secondary winding 54. One terminal of primary 53 is connected by conductor 55 to anode 30 of tube 11, and the other terminal is connected by conductor 56, terminal 57, conductor 58, resistor 60 and conductor 61 to terminal 17. Capacitor 12 is connected by conductors 62 and 63 to terminal 57 and conductor 26 respectively. Capacitor 12 is thus charged through resistor 60 by the source of power connected to terminals 17 and 25, and this same voltage is applied through primary winding 53 to anode 30 of tube 11. The anode circuit of tube 11 may now be traced from cathode 33, to anode 30 and then through primary 53 to terminal 57, through conductor 58, resistor 60 and conductor 61, to terminal 17 of source of power B, and from the latter through conductors 26 and 35 to conductor 43 and to cathode 33. An alternate circuit may be traced from terminal 57, through capacitor 12 to conductor 63 and then on, through conductor 35, as in the previous circuit.

The circuit for the photo cell 10 has already been traced from terminal 17, through conductor 16, to anode 15, and then from cathode 20, through conductor 21 to terminal 22 and through resistor 23 to common connection 24 and then to terminal 25 of the source of power. As previously mentioned, a rising change of illumination on the photo cell 10 causes a positive voltage change at terminal 22, and this is applied to the input or grid circuit of thyratron 11 through capacitor 52, conductor 50 to control grid 32, and from there to cathode 33, through conductors 43, 35 and 27 to common connection 24 and back through resistor 23 to terminal 22. The ignition device is completed by connecting secondary 54 of transformer 13 to flash bulb 14 by conductors 64 and 65, one of which, if desirable, may be connected to the common connection 24.

One of the features of this invention is the use of the special transformer 13 which is designed to pass a pulse or transient, as opposed to operation with a sinusoidal or comparable type of alternating current. The use of the step-down transformer 13 is indicated because a flash bulb 14 generally requires a current in the neighborhood of 2 to 3 amperes to ignite it. The maximum current which thyratron 11 is designed to transmit for very brief or instantaneous periods is of the order of 100 milliamperes which, of course, is much too small to operate the flash bulb 14. Furthermore, the impedance of the flash bulb 14 is relatively low (e. g. 0.4 ohm), while the internal impedance of the thyratron 11 is much higher (e. g. 214 ohms). In order to realize the maximum heating of the lamp filament, maximum power must be drawn from the thyratron as a generator; and to do this, the impedance of the load must match the impedance of the generator. Both of these problems may be solved by the use of transformer 13; when designed to provide the correct voltage and current ratios, the transformer also offers the correct impedance match. Thus, assuming a typical voltage transformation ratio of 29 to 1, the impedance ratio is $29^2$ or 840 ohms. The load facing the thyratron is hence 840 times .4 (the resistance of the flash bulb), or 336 ohms, which is a sufficient match with the 214 ohms internal impedance of the thyratron for the necessary power delivery to the flash bulb.

However, since transformer 13 is energized by a pulse, as will be later described, the characteristics of the transformer are different from the usual transformer adapted to be continuously energized by a sinusoidal or other steady state alternating current.

Neglecting resistances, which will normally be relatively minor factors in such a transformer, the primary winding 53 may be considered as being the equivalent of two inductances in series, one inductance $L_L$ being the leakage inductance of the primary with respect to the secondary, and the other inductance $L_P$ being the primary inductance. The leakage inductance $L_L$ is the result of the magnetic flux of the primary which fails to link the secondary winding 54; while the primary inductance $L_P$ is the self-inductance of the primary. Since the fuse or filament of the flash bulb 14 acts substantially as a short circuit of the secondary winding 54, this short circuit resistance is reflected to the primary winding 53, and, in effect, short circuits the primary inductance $L_P$ to leave only the leakage inductance $L_L$ to limit the rate of rise of current in the thyratron plate circuit. In order to secure the most efficient operation of the circuit, the leakage inductance should be kept to the minimum value which will limit the current in the primary to the allowable current rating of the thyratron, while the primary inductance, whose stored energy acts to maintain the output after the initial steep wavefront, should be as high as possible. It has been found that the leakage inductance may vary between one-half and fifty millihenries as limits but that best results are obtained when the value of $L_L$ is between 4 and 8 millihenries. Similarly, the value of the primary inductance may vary from 0.3 henry to several henries, there being no upper limit which should not be exceeded, except those encountered in design which will cause the value of the leakage inductance to be raised above desirable values. The value of the primary inductance $L_P$ should be maintained relatively large since it, in effect, holds up or maintains the secondary current after the initial steep rise caused by the firing of the thyratron 11. This permits the effective use of the energy stored in capacitor 12, and ignition of the flash bulb 14 is insured. The pulse transformer 13 is thus somewhat different from the usual form of low frequency power transformers, since the pulse transformer is designed to have a minimum leakage inductance $L_L$, a maximum primary inductance $L_P$, and to be operated with its secondary winding 54 short circuited by the flash bulb 14. It will be appreciated that other factors enter into the computation and calculations of the windings 53 and 54, but these factors, such as distributed capacity, generally control the decay of the pulse in the secondary circuit, which decay occurs after the fuse or filament element of flash bulb 14 has been operated, and hence is of no concern in this device.

Operation

When the flash bulb igniter herein described is to be used, it is placed in the proper position to illuminate the scene to be photographed, and it is also located so that it will receive the direct light from the principal or master flash bulb which is normally located adjacent the camera. Swith 37 is closed so that battery 41 is connected to heater 34 to energize the latter and heat cathode 33, but the bias provided to control grid 32 by resistors 45 and 46 prevents any electrons emitted by the cathode from reaching anode 30 and triggering thyratron 11. The voltage source B connected to terminals 17 and 25, which is preferably one or more miniature batteries adapted to provide approximately 90 volts, is connected through resistor 60 to capacitor 12 and charges the latter. The same voltage is applied to the photo cell 10, and a relatively small current, depending upon the constant illumination falling upon the photo cell, will flow through the latter and cause a voltage drop to appear between terminal 22 and common connection 24. However, since this illumination is relatively constant, the voltage appearing between these terminals will be relatively constant, and will have no effect upon the control grid in its triggering of thyratron 11. Since no current flows between anode 30 and cathode 33 of thyratron 11, primary 53 of transformer 13 is not energized and flash bulb 14 is not ignited.

However, when the control or master flash bulb is ignited, generally by some synchronizing means connected with the shutter of the camera taking the picture, the light falling upon photo cell 10 is greatly increased in a very short space of time. As a result, the current flowing through the photocell 10 is rapidly increased and the voltage difference between terminals 22 and 24 changes very suddenly. Resistors 23, 45, and 46 combine with capacitor 52 to form, in effect, a high pass filter which, when the light change is rapid enough, transmits the resulting change to superimpose the latter upon the normal bias of the control grid 32, causing the latter to swing toward a positive potential with respect to cathode 33 and thereby triggering the thyratron 11. When this occurs, the charge which has been accumulated on capacitor 12 is permitted to flow through primary winding 53 of transformer 13, thereby providing a pulse which causes an induced current to flow in secondary winding 54 to ignite the fuse or filament in flash bulb 14. The values of capacitor 12 and resistor 60 are so chosen that the time required for the capacitor to charge is greater than the de-ionization time of thyratron 11 so that more than one discharge is avoided, and there is but a single pulse provided for each flash of light falling on photo cell 10.

The source of power connected to terminals 17 and 25 provides a voltage sufficient to maintain the thyratron 11 in a conducting condition, but the current through resistor 60 causes a voltage drop which, when the condenser charge is dissipated, reduces the effective plate voltage of the thyratron below the value necessary to maintain ionization. The tube then de-ionizes, as previously mentioned, and the grid regains control in less time than that required for condenser 12 to recharge through resistor 60.

To prevent the thyratron 11 from being triggered by a flash of relatively low intensity light, or by a slow increase of light to a great intensity, the values of capacitor 52 and of resistors 23, 45, and 46 are selected so that only voltage changes or impulses having a relatively steep wave front are conducted through capacitor 52 without substantial attenuation or diminution, as previously mentioned. The characteristics of the thyratron 11 are such that the control grid 32 must be made slightly more positive than the bias point in order to trigger the tube, and to do this requires a sudden increase of light upon the photo cell, thus developing a transient voltage of steep wave front across resistance 23 which will be transmitted through capacitor 52. The increase of light must be very fast to provide a voltage of proper strength on the control grid, and this prevents the thyratron from firing when headlights, etc., are flashed on the photo cell.

As previously mentioned, the photo cell is preferably sensitive to infra-red radiation and in this way it responds to the heating of the fuse or filament in the master flash bulb before the principal source of light in the latter, whether it is foil, wire, or other material, can be ignited to provide the principal source of illumination. As a result, the thyratron 11 is triggered and flash bulb 14 is ignited in the shortest possible time after the circuit to the master flash bulb is closed. The delay inherent in this slave circuit does not exceed a few milliseconds and is generally in the order of microseconds. Furthermore, when the time of firing of flash bulb 14 is compared to the time of firing of the master flash bulb, the slave flash bulb is ignited at the same time or a few microseconds before the master bulb, thereby indicating that the triggering of thyratron 11 is caused by the igniting of the fuse or filament of the master bulb instead of the principal flash following thereafter. However, the circuit constants are such that a 100 watt bulb may be located three feet from the photo cell 10 and repeatedly turned off and on without triggering thyratron 11. The discrimination of the circuit is thus clearly demonstrated.

While various values may be assigned to the different components of the system, the following values, given by way of example only and not as a limitation, have been found to produce excellent results:

Resistors:
  23 _____megohms__ 1.8
  45 _____do____ 5.6
  46 _____do____ 2.7
  60 _____do____ 0.1
Capacitors:
  12 _____microfarads__ 4.0
  52 _____do____ 2.002
Tubes:
  10 _____ 930
  11 _____ GL546

The voltage of battery 41, as previously mentioned, is 6 volts, while the voltage of the power source B is 90 volts.

By using relatively small dry cell batteries, the entire assembly may be housed in a relatively small, light weight cabinet which is readily portable and may be placed wherever necessary. All connecting wires necessary for synchronizing the master flash bulb with the camera may be run from the latter to the master unit; and with the various values given and with the transformer 13 constructed in accordance with the requirements previously stated, flash bulb 14 is ignited whenever the light from the master flash bulb falls upon photo cell 10. While, of course, it would be possible to separate these slave units at such a distance from the master flash bulb that the amount of illumination reaching the photo cell 10 would be insufficient to trigger the thyratron 11, such conditions normally do not occur in the photographing of a scene of any reasonable dimensions.

It will thus be seen that a flash bulb ignition device has been provided which is reliable in operation, light in weight, and simple in operation. The voltage drain on the batteries is relatively small, and by using the voltage divider comprising the resistors 45 and 46, as the voltage of the battery 41 decreases, the bias on control grid 32 likewise decreases so that stable operation of the system results so long as sufficient power remains in the battery to heat the cathode 33 to the proper operating temperature.

While a preferred form of the system has been shown, it is obvious that modifications may be made therein which in no way depart from the spirit of the invention as disclosed herein, and the latter is not to be limited to the particular form or arrangement of parts herein described and shown, except as limited by the following claims.

I claim:
1. An igniter for a flash bulb of the type having an igniting fuse adapted to be melted by the heat of a firing current passed therethrough and containing combustible and combustion supporting materials, which includes: a capacitor; a step-down pulse transformer; means adapted to connect a source of power to said capacitor to charge the latter; a discharge circuit for said capacitor including electronic switching means adapted to connect said capacitor to the primary of said pulse transformer whereby said capacitor may discharge through said primary to produce a current pulse therein; and means for connecting the secondary of said pulse transformer to the fuse of said flash bulb whereby the latter is ignited by a greater current pulse appearing in said secondary as a result of said pulse in said primary.

2. An igniter for a flash bulb of the type having an igniting fuse adapted to be melted by the heat of a firing current passed therethrough and containing combustible and combustion supporting materials, which includes: a photocell; a resistor connected to the cathode of said photocell; means adapted to connect said photocell, in series with said resistor, to a source of electrical power; a gas-filled electron discharge tube of the thyratron type having a cathode, an anode, and a control electrode; a coupling capacitor having one terminal connected to said control electrode and the other terminal connected to said cathode of said photocell whereby a very rapid increase to a great intensity of the light falling on said photocell will "trigger" said thyratron; means adapted to cause said cathode of said thyratron to emit electrons; means normally adapted to maintain the control electrode of said thyratron at a slight negative potential with respect to said cathode thereof; a step-down pulse transformer having a secondary winding adapted to be connected to a flash bulb, and having a primary winding; a power resistor; means connecting one terminal of said primary winding to said anode of said thyratron, and connecting the other terminal of said primary winding to one terminal of said power resistor; means adapted to connect the remaining terminal of said power resistor to the positive terminal of a source of power, and to connect said cathode of said thyratron to the negative terminal of said source of power; and a discharge capacitor having one terminal connected to said negative terminal of said last mentioned source of power, and the other terminal connected to the point of common connection of said primary winding and said power resistor, whereby said thyratron is normally non-conducting, but is triggered as a result of a brilliant flash of light illuminating said photocell, whereupon said discharge capacitor is discharged and the pulse therefrom is delivered by said pulse transformer to the fuse of a flash bulb to ignite the latter.

3. An igniter for a flash bulb of the type having an igniting fuse adapted to be melted by the heat of a firing current passed therethrough and containing combustible and combustion supporting materials, which includes: a capacitor; means for connecting a source of power to said capacitor to charge the same; a thyratron having cathode, anode, and control grid electrodes; a step-down pulse transformer having primary and secondary windings; an anode circuit for said thyratron including therein said capacitor and the primary of said transformer; a photocell; a control grid circuit connecting said photocell to said control grid, a high pass filter in said control grid circuit preventing the triggering of said thyratron excepting by a high frequency transient voltage; and means for connecting the secondary winding of said transformer to the fuse of said flash bulb.

ALBERT K. EDGERTON.

REFERENCES CITED

The following references are of record in the file of this patent:

UNITED STATES PATENTS

| Number | Name | Date |
| --- | --- | --- |
| 2,071,370 | Williams et al. | Feb. 23, 1937 |
| 2,272,102 | Wildman | Feb. 3, 1942 |
| 2,395,600 | Weisglass | Feb. 26, 1946 |
| 2,399,222 | Germeshausen | Apr. 30, 1946 |
| 2,408,764 | Edgerton | Oct. 8, 1946 |